Aug. 30, 1949.  A. D. CASHION  2,480,549
LUBRICATING DEVICE
Filed Sept. 28, 1946
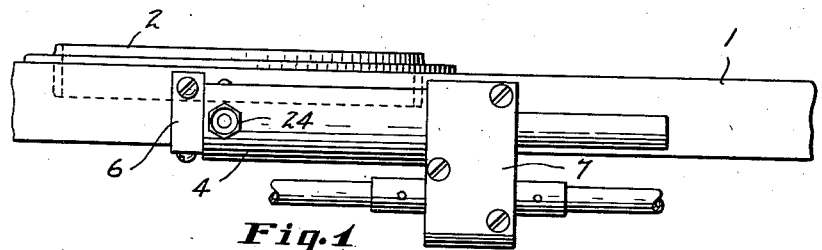
Fig. 1
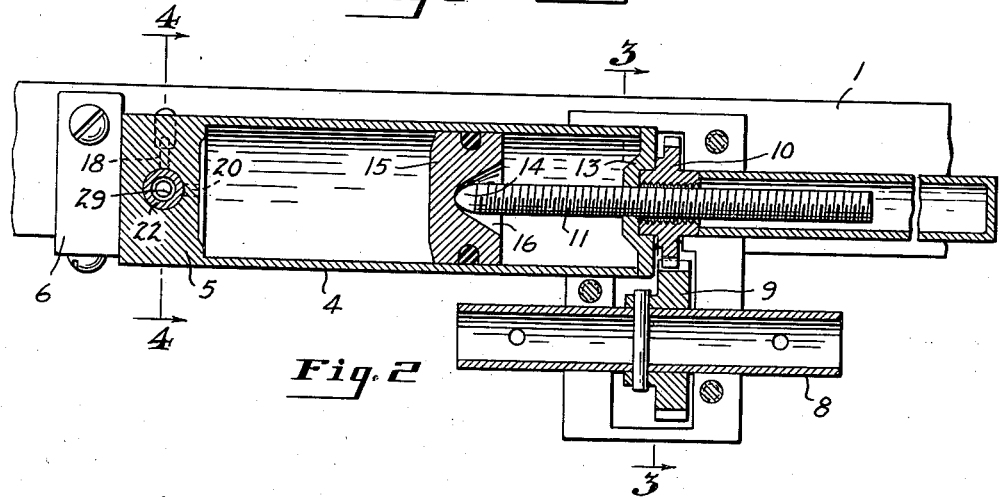
Fig. 2
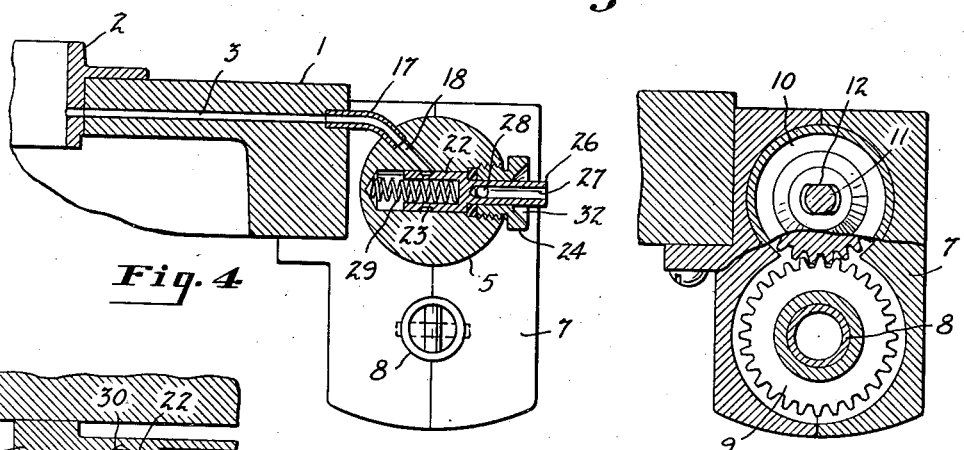
Fig. 4
Fig. 3
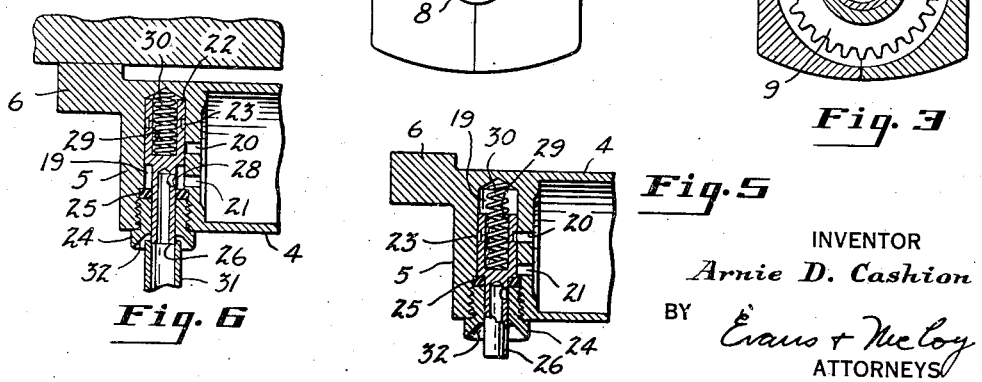
Fig. 6
Fig. 5
INVENTOR
Arnie D. Cashion
BY Evans & McCoy
ATTORNEYS Patented Aug. 30, 1949

2,480,549

UNITED STATES PATENT OFFICE 2,480,549

LUBRICATING DEVICE

Arnie D. Cashion, Davidson, N. C.

Application September 28, 1946, Serial No. 700,057

1 Claim. (Cl. 184—14)

This invention relates to lubricant feeding devices and more particularly to a device for delivering minute quantities of lubricant to the bearing surfaces of twister rings.

In the lubrication of twister rings it has been found desirable to deliver a very minute measured quantity of lubricant to the ring at intervals timed with respect to the reciprocating movements of the ring, and this feed is accomplished intermittently by the advancing of a piston in a lubricant feed cylinder toward the discharge end of the cylinder that is connected to the twister ring. Inasmuch as the quantity of lubricant forced from the cylinder at each actuation is exceedingly minute, amounting to about 4 to 6 ten thousandths of a cubic inch, it is absolutely essential that all air be excluded from the feed cylinder in order to insure accurate measurement of the minute charges of lubricant.

It is the object of the present invention to provide a simple and convenient means for filling the feed cylinder with lubricant which will be effective to exclude air from the feed cylinder.

With the above and other objects in view, the invention may be said to comprise the device as illustrated in the accompanying drawings hereinafter described and particularly set forth in the appended claims, together with such variations and modifications thereof as will be apparent to one skilled in the art to which the invention pertains.

Reference should be had to the accompanying drawings forming a part of this specification, in which:

Fig. 1 is a side elevation showing one of the feed devices of the present invention applied to a ring rail of a twister frame;

Fig. 2 is a central vertical longitudinal section through the feed cylinder;

Fig. 3 is a section taken on the line indicated at 3—3 in Fig. 2;

Fig. 4 is a section taken on the line indicated at 4—4 in Fig. 2;

Fig. 5 is a horizontal section through the cylinder head centrally of the filling valve, and Fig. 6 is a section similar to Fig. 5 showing the valve engaged by the nozzle of a lubricant supply device such as a grease gun.

In the accompanying drawings the device of the present invention is shown applied to a rail 1 of a twister frame in which a series of rings 2 are mounted, a fragment of the rail 1 and one of the rings 2 being shown in the drawings. A series of lubricant feed devices, one for each ring, are mounted on the rail 1 and operated simultaneously in timed relation to the reciprocating movements of the rail 1. Since the present invention is concerned with the feed unit per se, only one of such feed units is illustrated. As shown in Fig. 4, the rail 1 is provided with a passage 3 leading to the interior of the ring 2 for delivering lubricant to the ring, the lubricant being fed from a cylinder 4 mounted on the rail alongside the ring. The cylinder 4 is provided with a head 5 provided with an integral attaching flange 6 by means of which one end of the cylinder may be secured to the rail 1 and the opposite end of the cylinder 4 is supported in a sectional housing 7 that is detachably connected to the rail 1.

The lubricant feed device is operated by a line shaft 8 to which a gear 9 is attached which meshes with a gear nut 10 which has an internally threaded hub that receives a screw 11 which is moved axially by means of the nut 10. The nut 10 is mounted against axial movements in the housing 7 and the screw 11 is held against rotation by flat faces 12 which fit in an opening in a detachable cylinder head 13 through which the screw extends. At its inner end the screw 11 is rounded at 14 for engagement with a piston 15 that is provided with a central recess 16 to receive the end of the screw. The piston 15 is free from attachment to the screw 11 so that the screw 11 can be retracted independently of the piston 15 so that the piston can be moved toward the head 13 by the pressure of lubricant delivered into the cylinder.

The cylinder 4 is connected to the passage 3 in the rail 1 by means of a suitable tube 17 which connects the passage 3 with the passage 18 formed in the head 5 of the cylinder. The head 5 has a transverse bore 19 forming a valve chamber into which the passage 18 opens, openings 20 and 21 being provided on the inner side of the chamber to provide communication between the chamber and the interior of the cylinder 4. A valve 22 has a cylindrical body that has a sliding fit in the chamber 19 and that is provided with an external groove 23 that is adapted to register with the discharge passage 18 and opening 20 to establish communication between the interior of the cylinder and the passage 3. The valve 22 is retained in the chamber 19 by means of a gland nut 24 and gasket 25, the valve being provided with a stem 26 that extends through the nut 24. The stem 26 is provided with an axial passage 27 that extends to the outer end thereof and which has a lateral opening 28 at its inner end so positioned that in one position of the valve the openings 21 and 28 register and the passage 27 communicates with the interior of the cylinder 4.

When the valve 22 is in its outermost position the groove 23 registers with the passage 18 and opening 20 to establish communication between the cylinder and the passage 3. When the valve is in its innermost position communication is established between the passage 27 and the interior of the cylinder through the openings 28 and 21. During the operation of the feeder the valve is held in its outermost position by means of a spring 29 that is seated against the inner end of the chamber 19 and which extends into a recess 30 in the inner end of the valve 22. When it is desired to replenish the supply of lubricant in the cylinder 4, the shaft 8 is operated to retract the screw 11 and lubricant is then forced through the passage 27 into the cylinder to fill the cylinder and force the piston 15 into engagement with the retracted screw.

The stem 26 is formed to receive a nozzle 31 through which lubricant is supplied to the cylinder, the nozzle 31 being the delivery nozzle of a suitable lubricant supply device such as a grease gun. In filling the cylinder the nozzle 31 is pressed against the stem 26, moving the valve inwardly to the position shown in Fig. 6 and lubricant is forced from the nozzle 31 and passage 27 into the cylinder until the cylinder is filled. The nut 24 is preferably provided with a recess 32 to receive the nozzle 31 so that the nozzle may be readily retained in proper engagement with the stem 26. The movement of the valve to its innermost position cuts off the delivery passage 18 and opens the passage 27 to the cylinder so that the lubricant can be forced under the desired pressure into the cylinder 4 to force the piston 15 to its retracted position. By so forcing the lubricant into the cylinder, the cylinder may be filled with lubricant without drawing any air into the cylinder, so that when the piston 15 is again moved by the screw 11 toward the discharge end of the cylinder, lubricant may be intermittently advanced through the passage 3 to the ring in such manner that a solid column of lubricant is maintained between the cylinder and the ring without any air bubbles which would destroy the continuity of feed and the accuracy of measurement of the intermittently fed charges.

It is to be understood that variations and modifications of the specific devices herein shown and described for purposes of illustration, may be made without departing from the spirit of the invention.

What I claim is:

In a lubricant feeding device, a cylinder having a head provided with a valve chamber closed at its inner end and having a gland of smaller internal diameter at its outer end, said head having delivery passages from said chamber to the interior of the cylinder and from said chamber to the exterior of the head and an inlet passage from the interior of the cylinder to the valve chamber, and a valve slidably fitting in said chamber, said valve having a recess opening to its inner end and a spring mounted in said recess and engaging the inner end of said chamber, said spring normally holding said valve in its outermost position against said gland and being compressible into said recess to permit said valve to seat against the inner end of said chamber, said valve having portions adapted to connect said inlet passage to said exterior delivery passage and to close the interior delivery passage in the outermost position of the valve and to open the interior passage and close the other passages when the valve is moved inwardly, said valve having a stem that fits in said gland and projects past said gland, said stem having an axially extending passage to the outer end thereof that has a lateral opening adjacent its inner end that is closed by said gland when the valve is in its outermost position.

ARNIE D. CASHION.

REFERENCES CITED

The following references are of record in the file of this patent:

UNITED STATES PATENTS

| Number | Name | Date |
|---|---|---|
| 1,097,422 | Gesell | May 19, 1914 |
| 1,400,207 | Bliven | Dec. 13, 1921 |
| 1,562,037 | Moore | Nov. 17, 1925 |
| 1,696,737 | Scoville | Dec. 25, 1928 |
| 1,893,087 | Kerns | Jan. 3, 1933 |